Oct. 29, 1963     H. J. TROCHE     3,108,655

VEHICLE TOWER

Filed Sept. 16, 1958

INVENTOR.
HERMAN J. TROCHE

BY Bates, Teare & McBean
ATTORNEYS

United States Patent Office 3,108,655
Patented Oct. 29, 1963

3,108,655
VEHICLE TOWER
Herman J. Troche, Fairview Park, Ohio, assignor to J. H. Holan Corporation, Cleveland, Ohio, a corporation of Ohio
Filed Sept. 16, 1958, Ser. No. 761,369
3 Claims. (Cl. 182—2)

This invention relates to a mobile aerial tower having pivotally interconnected articulated tower sections carrying a work platform at the outer extremity thereof which may be elevated to a plurality of overhead positions.

One of the more common uses of aerial towers of the type indicated is to provide access to traffic lights, street lamps, overhead power lines, and similar objects for installation, maintenance and repair thereof. In such use, high voltage electricity is often encountered, which effectuates a hazardous condition for personnel on the work platform, in that the tower provides the conducting means through which the electricity may tend to ground itself.

An object of the invention is to provide a mobile aerial tower of the type indicated, which may be used with comparative safety around high voltage power lines.

A further object of the invention is to provide a mobile aerial tower affording protection from electrical shock to the operator on the work platform thereof.

Briefly, the foregoing objects are accomplished by the provision of a mobile aerial tower having a pair of tower sections pivotally coupled together in end-to-end relation through an articulated connection. The lower section is pivotally secured to a supporting mast for rotation in a vertical plane, the mast being rotatable in a horizontal plane. The free end of the upper tower section pivotally supports one or more work platforms. The sections contain a system of interconnected drums and cables which coact between the mast, the articulated connection, and the work platform and are adapted to dispose the work platform in any one of a plurality of overhead positions. At least a portion of the upper tower section is constructed of a material which provides an effective insulation against the flow of electrical energy. Additionally, the control cables and the leveling cables within the upper section have electrical insulators interposed thereon to prevent the flow of electrical energy through the cables. With this construction, the work platform is effectively insulated from the ground thereby affording protection from electrical shock to an operator on the work platform.

Other objects and advantages of the invention will be apparent from the following description taken in conjunction with the accompanying drawings in which:

FIG. 1 is a side elevational view of a utility truck employing an aerial tower constructed in accordance with the invention and showing in dot-dash lines some of the positions the tower and the associated work platform may be disposed in;

Figure 1:
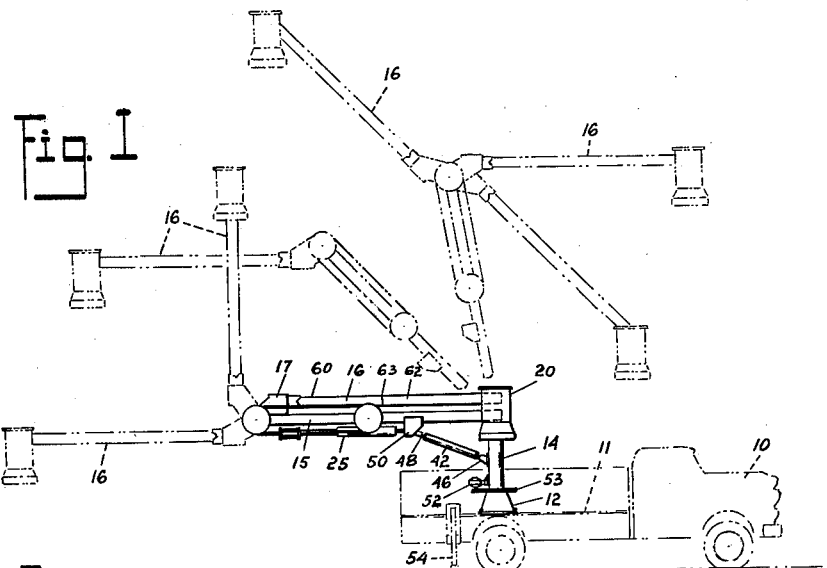

Referring to FIG. 1, there is shown a wheeled utility vehicle 10 having a truck body forming a base 11, which carries a vertical mast or pedestal 12, the upper portion 14 of which is rotatable in a horizontal plane through 360°, and supports a collapsible or articulated tower assembly at its upper extremity. Such tower assembly, in the present instance, includes a pair of hollow tower boom members or sections 15 and 16 pivotally interconnected at one of their adjacent ends through the saddle member 17. Such pivotal connection enables the upper section 16 to be pivoted in a vertical plane relative to the lower section 15.

The tower section 16 may carry one or more of the work platforms 20 at its outer extremity. The work platforms are maintained in a level position with respect to the vehicle body 11 by means of a leveling cable and drum system, the connecting elements or leveling cables of which are disposed interiorly of the sections 15 and 16, and are identified as cables 18 in FIGS. 3 and 4. The upper section 16 is pivoted or tilted relative to the lower section 15 by means of a fluid-actuated piston motor 25 and a coacting cable control system, the connecting elements or control cables of which are disposed interiorly of the sections 15 and 16 and are identified as cables 21 in FIGS. 2, 3 and 4. The leveling cable and drum system and the cable control system are not part of this invention and therefore will not be described in detail.

The lower section 15 is tilted with respect to the mast 12 by means of a fluid-actuated double acting piston motor 42 having a cylinder anchored to the bracket 46 carried by the rotatable portion 14 of the mast. The piston rod 48 of the motor 42 is pivotally connected at its external extremity to a bracket 50 mounted substantially intermediate the ends of the lower section 15.

The upper portion 14 of the mast 12 is rotated in a horizontal plane by means of a two-way fluid-actuated motor 52, which is provided with a driving connection with such upper portion in a suitable manner, such as by means of the gearing 53.

Thus, controlled operation of the collapsible tower assembly to position the work platform 20 to any desired work location is accomplished by selectively supplying operating fluid to each of the fluid motors 25, 42 and 52 through a conventional fluid piping system including fluid supply and return lines, such system not being described in detail since it forms no part of the invention.

Retractable fluid actuated jacks 54 extend outwardly from the sides of the vehicle body 11 to engage the ground surface and thereby anchor the vehicle body in a rigid, stationary position to insure stability during movement of the tower assembly. The jacks 54 may be extended and retracted in any suitable manner, such as by fluid-actuated motor units, which may be coupled to a source of operating fluid in a conventional manner. The universality of movement of the work platform 20 relative to the supporting vehicle body 11 provides virtually unlimited access to any point relative to the vehicle and within the dimensional limits of the structural members of the tower assembly.

Figure 2:
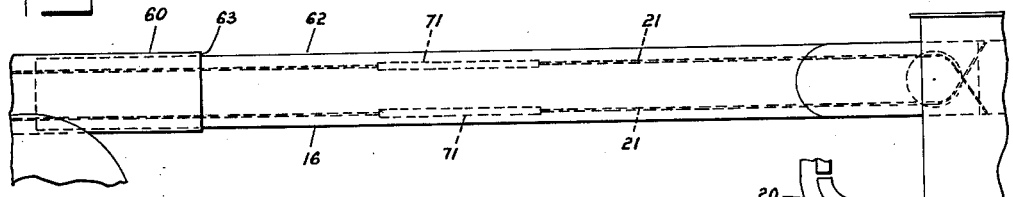
FIG. 2 is an enlarged partial side elevational view of the upper portion of the upper tower section shown in FIG. 1.
Figure 3:
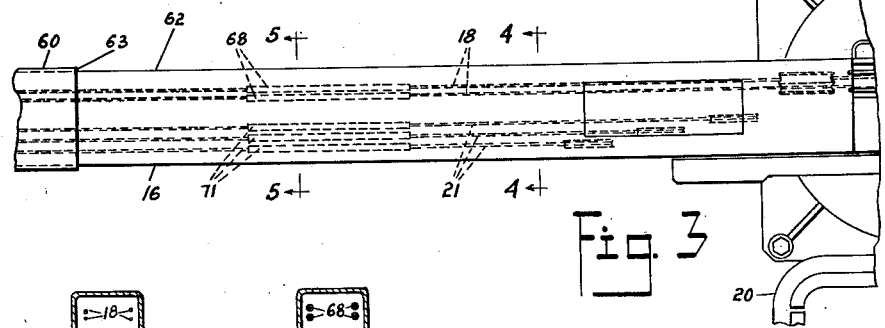
FIG. 3 is a partial top sectional view of the tower section shown in FIG. 2.
Figure 4:
FIG. 4 is an enlarged view taken along the line 4—4 of FIG. 3.
Figure 5:
FIG. 5 is an enlarged view taken along the line 5—5 of FIG. 3.
Figure 6:
FIG. 6 is an enlarged side elevational view of one of the cable insulator connections shown in FIG. 2.

The upper tower section 16, in the present instance, is formed of a lower member 60 and an upper member 62, such members being secured together by any suitable means as, for example, the telescopic interfitting joint shown at 63 in FIGS. 2 and 3. In accordance with the invention, the upper member 62 may be constructed of any one of a number of materials that provide an effective insulation against the flow of electrical energy such materials being known as non-conducting or insulating materials. Of such materials, Fiberglas is unusually effective, not only because of its excellent electrical insulation characteristics, but also because of its strength and rigidity. Additionally, the leveling and control cable 18 and 21 are insulated against the flow of electrical energy by the interposition of the respective electrical insulators 68 and 71 thereon as shown in FIGS. 3, 4 and 5 In the latter structure, each of the cables are completel severed, with the insulators connecting the respective adjacent spaced cut ends in the manner shown in FIG. 6. The insulators 68 and 71 may be constructed of Fiberglas.

Although the invention has been described with reference to a mobile aerial tower comprising a pair of pivotally interconnected tower sections, it will be understood that the invention may be applied to a mobile aerial tower having only one tower section or to a tower having a plurality of such sections.

I claim:

1. A mobile aerial tower comprising a base, a first tower section defining a hollow arm having one end thereof mounted on said base for tilting movement in a vertical plane and for rotational movement in a horizontal plane, a second tower section defining a hollow arm having one end pivotally secured to the other end of said first tower section for tilting movement in a vertical plane, said second tower section having a work platform secured to its other end for supporting an operator, said tower being formed of primarily metallic, electrically conducting material to give the tower sufficient strength and rigidity, and means coacting with the tower sections for disposing the work platform into any one of a plurality of positions and including connecting elongated metallic control elements disposed interiorly of and extending along the sections, said control elements intermediate the ends of said sections being disposed in spaced non-electrical conducting relation with the respective section while being in electrical conducting relation with the respective section adjacent the ends of the latter, said second section intermediate said other end of said first section and said platform having a lengthwise and circumferentially extending portion thereof constructed of a non-electrical conducting fiberglass reinforced material providing an effective insulation against the flow of electrical energy along the tower, and which separates in insulating relation the work platform from the electrical conducting first tower section, said connecting elements having electrical insulators interposed therein in said second section, thereby providing complete insulating protection from electrical shock to an operator on the platform.

2. A mobile aerial tower comprising a base, a mast mounted on the base for rotation in a horizontal plane, a first tower section defining a hollow arm having one end thereof mounted on the mast for tilting movement in a vertical plane, a second tower section defining a hollow arm having one end pivotally connected to the other end of said first tower section for pivotal movement in a vertical plane, a platform pivotally supported in cantilever fashion adjacent the other end of said second tower section for pivotal movement in a vertical plane and adapted to support an operator, said tower sections being formed of primarily metallic electrically conducting material to give the tower sufficient strength and rigidity, control means coacting with the tower sections for disposing the platform into any one of a plurality of predetermined positions and including metallic control cables disposed interiorly of the tower sections and extending therealong, a leveling cable and drum system for maintaining the platform in a level position with respect to the base, and including metallic leveling cables disposed interiorly of the tower sections, said second section including a socket portion intermediate its ends and receiving therein in secured relation a lengthwise and circumferentially extending portion constructed of non-electrical conducting fiberglass reinforced material, thereby separating in insulating relation said platform from said first electrical energy conducting tower section and providing an effective insulation against the flow of electrical energy along said tower, said cables intermediate the ends of said tower sections being disposed in spaced non-electrical conducting relation with the respective section, while being in electrical conducting relation with the respective section adjacent the ends of the latter, each of said cables in said second section having fiberglass reinforced, elongated, hollow electrical insulators of predetermined length interposed between and connecting spaced confronting ends of the respective cable, thereby providing complete protection from electrical shock to an operator on the work platform.

3. An aerial tower constructed in accordance with claim 1 wherein said connecting elements comprise flexible cables and said electrical insulators are formed of fiberglass reinforced elongated members of predetermined length.

References Cited in the file of this patent

UNITED STATES PATENTS

| | | |
|---|---|---|
| 2,439,186 | Pohle | Apr. 6, 1948 |
| 2,616,768 | Stemm | Nov. 4, 1952 |
| 2,788,167 | Morrison | Apr. 9, 1957 |
| 2,825,752 | Knutz et al. | Mar. 4, 1958 |
| 2,841,998 | Troche | July 8, 1958 |
| 2,855,134 | Arnold | Oct. 7, 1958 |
| 2,881,030 | Troche | Apr. 7, 1959 |
| 2,936,848 | Hall | May 17, 1960 |
| 2,940,539 | Richey | June 14, 1960 |